Aug. 30, 1955   W. CZERWINSKI   2,716,529
SEALS FOR CLOSURES OF PRESSURIZED COMPARTMENTS
Filed Jan. 29, 1953   4 Sheets-Sheet 1
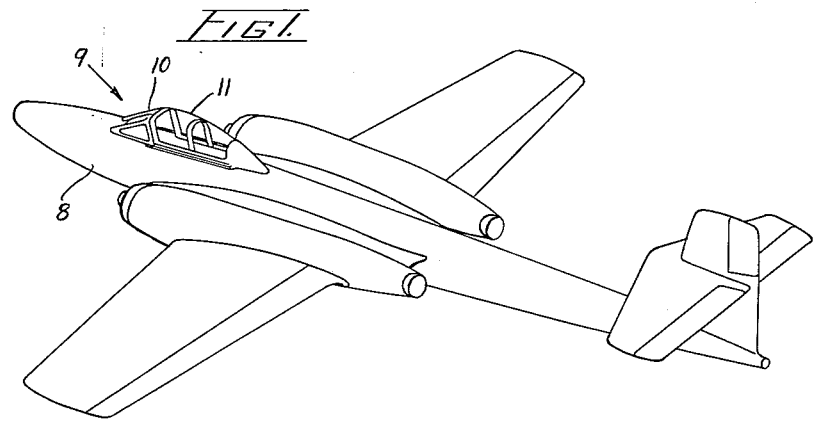
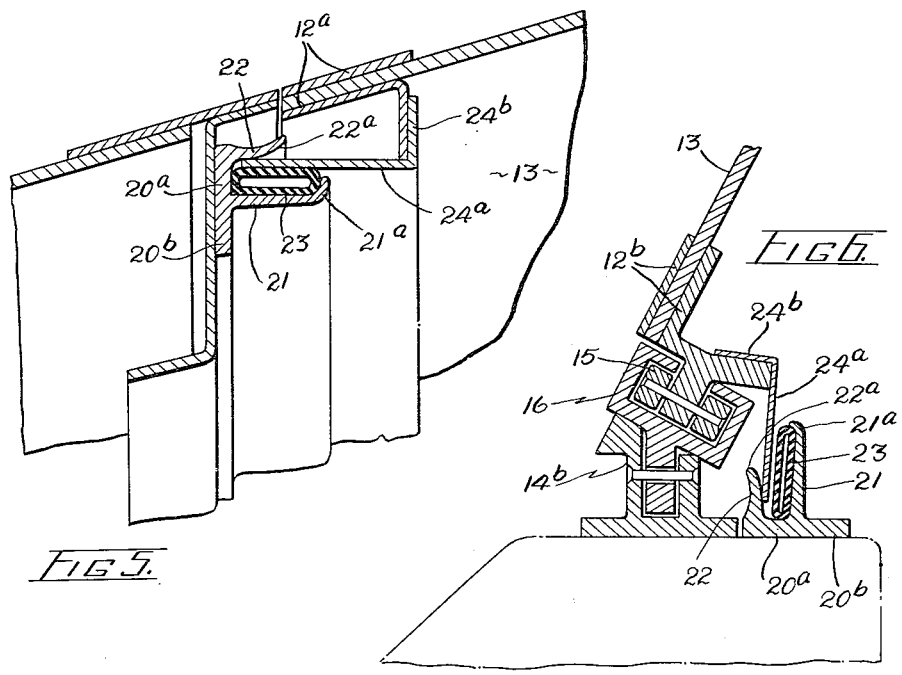
INVENTOR
W. CZERWINSKI
PER
Maybee & Legris.
ATTORNEYS.

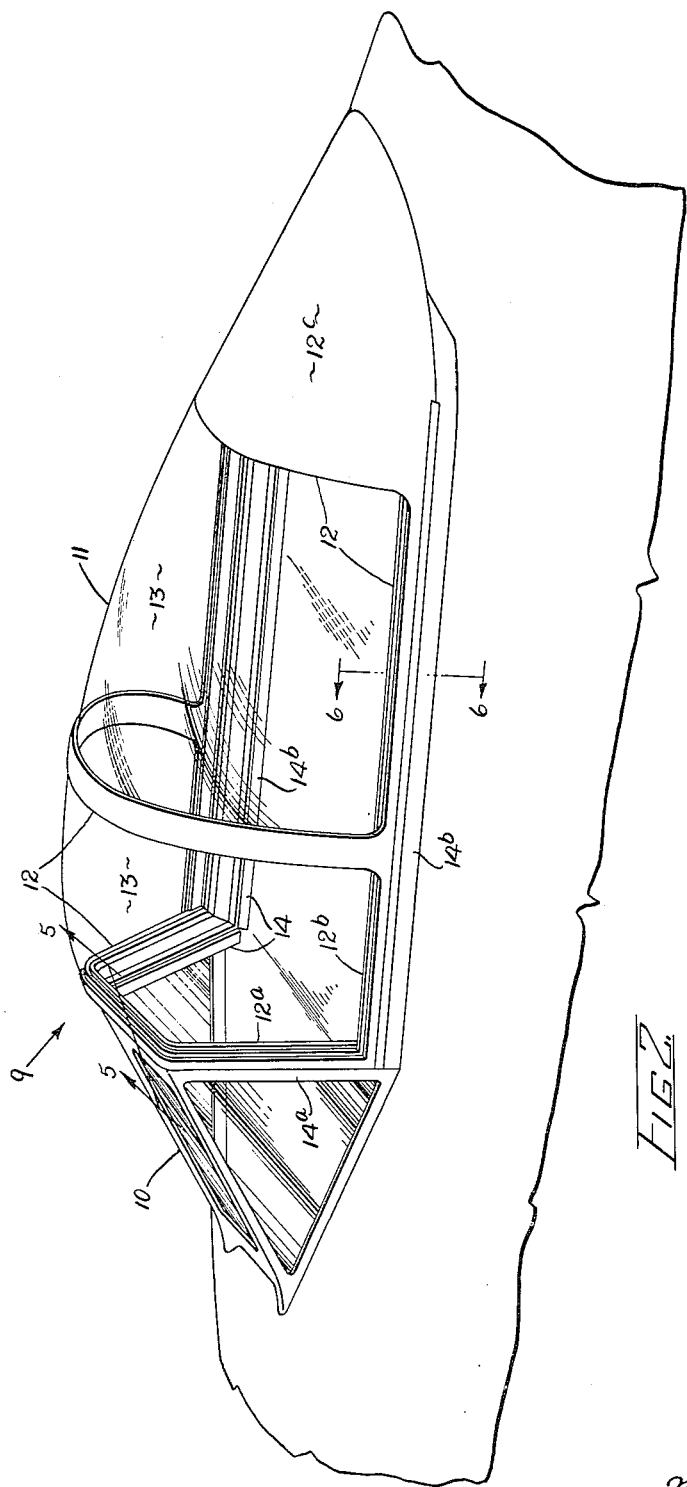

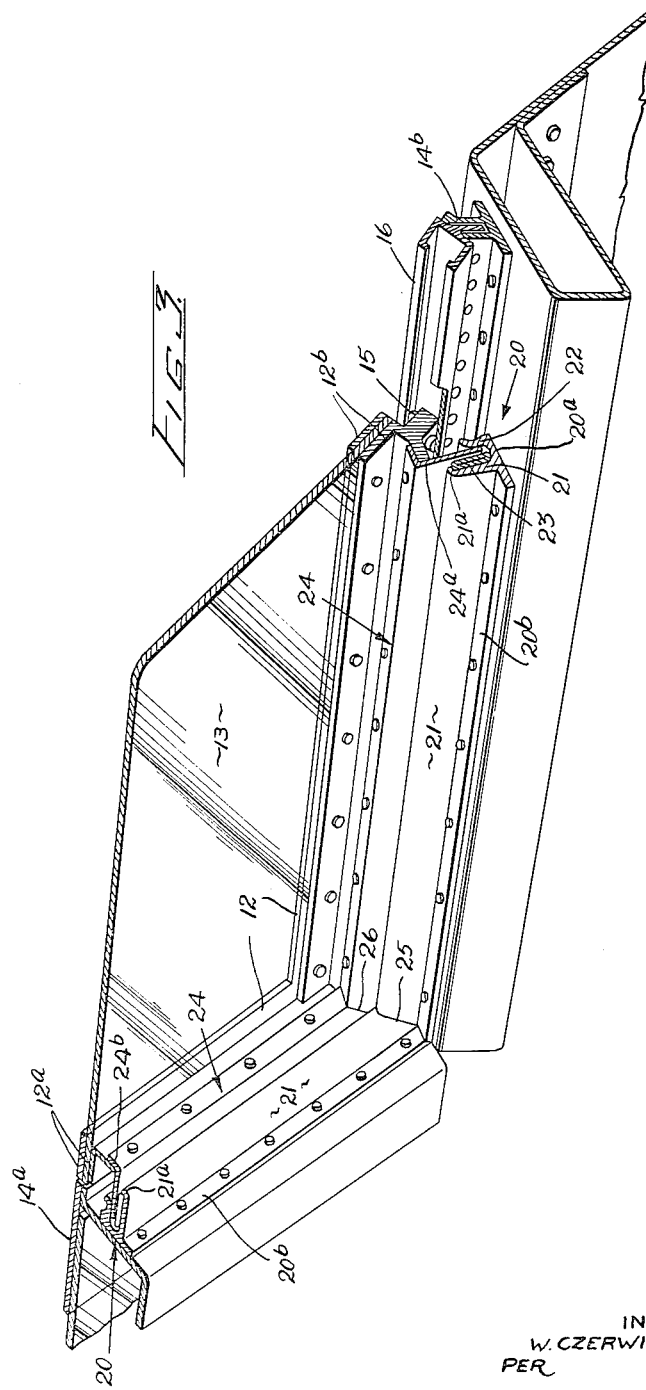

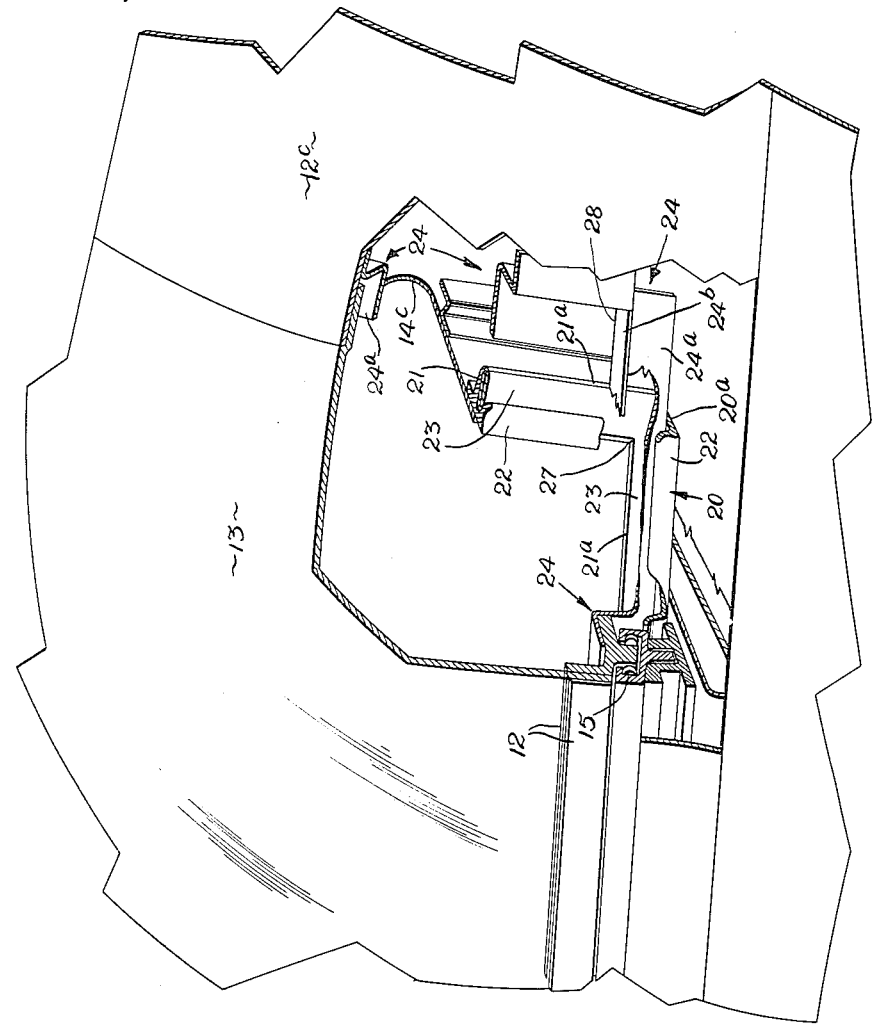

United States Patent Office 2,716,529
Patented Aug. 30, 1955

2,716,529

SEALS FOR CLOSURES OF PRESSURIZED COMPARTMENTS

Waclaw Czerwinski, Toronto, Ontario, Canada, assignor to A. V. Roe Canada Limited, Malton, Ontario, Canada, a corporation Application January 29, 1953, Serial No. 333,855

Claims priority, applications Canada and Great Britain June 17, 1952

8 Claims. (Cl. 244—121)

This invention refers to seals for closures of pressurized compartments and in particular to seals for canopies closing the pressurized cockpits of aircraft.

In modern aircraft, especially those used for military purposes and flying at high altitudes, pressurization is necessary at all crew stations. In those types employing a sliding closure over the cockpit, difficulty has arisen in the provision of an adequate and serviceable seal between the slidable portion of the canopy and the frame into which it slides. In non-sliding closures and in ordinarily hinged doors of pressurized compartments the same problem exists, although to a lesser extent.

A form of seal now commonly in use consists of a flexible tube surrounding the frame and inflatable against the adjacent parts of the closure. Though usually fairly satisfactory when first installed, seals of this type suffer from one or more familiar defects. For example, because of its exposed position around the frame, the flexible tube is subject to physical damage, and contamination and deterioration by dirt, oil and other foreign matter. Again, in some seals, it is necessary to maintain close tolerances between mating and coacting parts, resulting in constructions difficult and expensive to manufacture. Furthermore, the seal is not always independent of the pressure differential between the interior and exterior of the pressurized compartment and, in some instances the configuration is such that the seal, being intermediate the closure and the frame, tends, when inflated, to force the two farther apart, so distorting the structure and decreasing its own effectiveness.

The object of this invention is to provide a seal of the type using an inflatable tube which is well protected and not subject to accidental damage and contamination. Another object is to provide a seal which may be readily manufactured to wide tolerances. Still another object is to provide a seal, which is entirely independent of the pressure differential across the seal and which will not distort the structure of the closure or of the frame in which it lies.

Other objects and advantages will become apparent during the course of the following description of a preferred example.

In the accompanying drawings, forming a part of this specification, and in which like numerals are employed to designate like parts throughout the same:

Fig. 1 is a perspective view of a typical modern military aircraft and shows the general form and location of the cockpit canopy;

Fig. 2 is an enlarged perspective view of the canopy shown in Fig. 1;

Fig. 3 is an enlarged fragmentary view showing in more detail the construction of a forward corner of the canopy;

Fig. 4 is an enlarged fragmentary view showing in similar detail the construction of a rear corner of the canopy, the canopy being shown as having been partly withdrawn from the windscreen;

Fig. 5 is an enlarged section taken on the line 5—5 in Fig. 2 and showing the tube inflated; and Fig. 6 is a similar enlarged section taken on the line 6—6 in Fig. 2, but showing the tube deflated.

The pressurized compartment or cockpit of the aircraft 8 in Fig. 1 is enclosed by a streamlined canopy 9 which includes a windscreen 10 and a slidable closure or hood 11. As clearly shown in Fig. 2 the slidable hood 11 consists of a metal hood-framing structure 12 which holds transparent enclosing panels 13. On its rim are an arched front frame member 12$^a$, fore and aft frame members 12$^b$ and a rear frame member 12$^c$.

In the closed position the hood 11 engages a cockpit rim 14 bounding the cockpit opening and including the rearward rim member 14$^a$ of the windscreen 10, two fore and aft rim members 14$^b$ on the body of the aircraft and, at the rear of the cockpit, the upper perimeter of a transverse bulkhead 14$^c$ which is arched upwardly above the level of the two fore and aft rim members to conform to the transverse contour of the inner surface of the hood 11. The fore and aft frame members 12$^b$ of the hood structure 12 carry rollers 15 which run in retaining tracks 16 incorporated in the fore and aft rim members 14$^b$ (see Fig. 6), permitting the hood to be slid back to open the compartment. In the forward or closed position the hood is in engagement with the entire perimter of the cockpit rim.

The seal which must be provided around the opening so that the joint between the rim and the hood will be pressure-tight comprises a stationary component mounted on the cockpit rim and a coacting component mounted on and moving with the frame members of the hood. The stationary component of the seal comprises a channel structure 20 preferably with a cross-section as shown in Figs. 5 and 6 defined by mutually opposed connected walls, a relatively wide support wall 21 and a narrow guide wall 22 integrally connected at one edge to and laterally spaced from the wall 21 by a base 20$^a$. A longitudinal flange 21$a$ formed at the outer edge of the wall 21 extends generally towards the wall 22 so that the wall 21 provides a channel 21$^b$ enclosing substantially on three sides, a hollow inflatable tube or similar expansible element 23. The guide wall 22 is spaced from the support wall 21 by a distance greater than the collapsed thickness of the said tube and in cross-section curves generally away from the wall 22 to provide a sealing surface 22$^a$ curved convexly in cross-section at its inner face. The channel structure 20 is secured to the rim 14 by means of a longitudinal base flange 20$^b$. Co-operating with this stationary component is the moving component of the seal, consisting of a thin resilient metal sealing strip 24, providing a flexible blade 24$^a$, which is adapted to project into the channel 20 to bear lightly against inner sealing surface 22$^a$ of the wall 22, and which is attached to the frame structure 12 of the hood 11 by means of a longitudinal flange 24$^b$.

At each corner where the seal makes a change of direction from the fore and aft members 14$^b$ to the line followed by the rearward rim member 14$^a$ of the windscreen, a miter joint 25 is provided in the channel structure 20 in the manner shown in perspective in Fig. 3. A similar simple miter joint 26 is made in the sealing strip 24 at this point also.

A more complex joint is required at the rear where the seal makes a change of direction from the fore and aft rim members 14$^b$ to the curved contour of the bulkhead rim 14$^c$. This joint is shown in Fig. 4. The change of direction of the channel structure 20 is effected through a miter joint 27 in the support wall 21 but the portion of the channel structure secured to the bulkhead 14$^c$ is reversed in relation to the portion of the channel structure secured to each member 14$^b$, so that the flange 21$^a$ of the former blends into the base 20$^a$ of the latter and vice versa. The guide wall 22 and the base 20$^a$ of the portion of the channel structure secured to the bulkhead 14$^c$ are cut away from the joint 27 sufficiently to enable the sealing strip 24 attached to the fore and aft member 12$^b$ to move longitudinally in its channel 20; the guide wall 22 and flange 20$^b$ of the latter channel structure are however extended to the extreme end of the channel and are not cut off obliquely to conform to the mitering of the support wall 21. The sealing strip 24 changes direction at each of these corners by a simple angle butt joint 28 where the blade 24$^a$ of the portion of the guide strip attached to the bulkhead meets the intersection of the flange 24$^b$ and the blade 24$^a$ of the portion attached to the fore and aft member 12$^b$. Again the portion of the strip which follows the transverse contour of the hood is reversed in relation to the fore and aft portions of the strip.

It is important that around the entire seal the surface of the blade 24$^a$ should be exactly parallel to the direction of the tracks 16 and the coacting channel 20 should be accurately disposed to accommodate the said blade. When the hood is in the closed position the blade 24$^a$ takes up a position such that it bears lightly against the inner sealing surface of the wall 22 in substantially unbroken continuity around the cockpit opening. The inflatable tube 23 is connected to some source of fluid under pressure, preferably air, and when it is desired to seal the cockpit in order to retain its pressurization, the tube 23 is inflated, forcing the flexible blade 24$^a$ tightly against the inner sealing surface 22$^a$ of the wall 22. The action forms a tight and effective seal in which the forces are all confined between the walls 21 and 22 within the structure of the channel 20, there being no tendency to apply any force to the structure 12 of the hood which might distort it in relation to the cockpit rim 14. Those familiar with the art will know that due to the high coefficient of thermal expansion of the transparent plastics commonly used for the panels 13 considerable expansion and contraction of the structure 12 relative to the frame 14 is likely to occur and it will be noted that in such circumstances relative movement will take place substantially along the surface of the blade 24$^a$, in which direction the blade is subject only to frictional constraint in the coacting channel.

When the tube 23 is deflated, it takes up a position within the channel 21$^b$ in the support wall 21 such that there is ample clearance between the tube and the blade 24$^a$. This allows the hood to be opened freely without any danger of chafing or rubbing of the blade against the tube.

It is well-known in the art to provide automatic means whereby on unlocking the hood, the deflating valve is opened and the tube is allowed to collapse while the movable portion of the canopy remains stationary, so that no damage will result to the tube. A device such as this might be added advantageously to this construction but it is not a part of the invention and therefore has not been described herein.

When the hood is opened the metal sealing strips 24 attached to the fore and aft members 12$^b$ of the hood structure move longitudinally along the channels 20 in which they are accommodated, while the blade 24$^a$ is withdrawn rearwardly from the channels 20 around the windscreen structure 14$^a$ and the perimeter of the bulkhead 14$^c$. The invention herein disclosed has been illustrated by showing its application to a sliding type hood of a pressurized aircraft. It is to be understood that its application is in no way limited to this one construction. This seal may be applied just as readily to a hinged canopy, to doors, portholes or hatches not only on aircraft but on any pressurized compartment requiring a positive, effective seal against the escape of a gas or a liquid. It is therefore to be understood that the form of the invention herewith shown and described is to be taken as a preferred example of the same and that various changes in the shape, size and arrangement of parts may be resorted to without departing from the spirit of the invention or the scope of the subjoined claims.

What I claim as my invention is:

1. Sealing means for an opening in a pressurized compartment comprising a closure for the opening having its rim cooperating in fitting relationship with the rim of the opening, generally parallel spaced apart walls on one of the rims and defining a channel, a flexible blade projecting from the other rim into the channel to touch one of the walls, and an expansible element disposed in the channel between the blade and the other wall and expansible to press the blade against the first-mentioned wall to provide a seal between the rims.

2. Sealing means for an opening in a pressurized compartment comprising a closure for the opening having its rim cooperating with the rim of the opening, generally parallel spaced apart walls on and co-extensive with one of the rims and defining a channel, a flexible blade co-extensive with and projecting from the other rim into the channel to touch one of the walls, an inflatable tube in the channel between the blade and the other wall, the other wall having its outer edge extending towards the first-mentioned wall and partially closing the space between the walls, the tube when inflated pressing the blade against the first-mentioned wall to provide a seal between the rims.

3. Sealing means for an opening in a pressurized compartment comprising a closure for the opening having its rim co-operating in fitting relationship with the rim of the opening, generally parallel spaced apart walls on and co-extensive with one of the rims and defining a channel, a flexible blade projecting from the other rim into the channel to touch one of the walls, the other wall presenting in cross-section along its length a concavity facing the first-mentioned wall, and an inflatable tube in the concavity and co-extensive with the first-mentioned wall, the tube when inflated pressing the blade against the first-mentioned wall to provide a seal between the rims.

4. Sealing means for an opening in a pressurized compartment comprising a closure for the opening having its rim co-operating in fitting relationship with the rim of the opening, generally parallel spaced-apart walls on one of the rims and defining a channel, one of the walls having a guiding and sealing surface curved convexly in cross-section and facing the other wall, a flexible blade projecting from the other rim into the channel to touch the said one of the walls, an inflatable tube in the channel between the blade and the other wall, the tube when inflated pressing the blade against the first-mentioned wall to provide a seal between the rims.

5. Sealing means as claimed in claim 1 comprising a rigid channel base extending between and rigidly connecting the walls.

6. Sealing means as claimed in claim 2 comprising a rigid channel base extending between and rigidly connecting the walls.

7. Sealing means as claimed in claim 4 comprising a rigid channel base extending between and rigidly connecting the walls.

8. Sealing means for an opening of a pressurized compartment comprising a closure for the opening having its rim co-operating in fitting relationship with the rim of the opening, each rim having fore and aft sealing members in interlocked slidable engagement with those on the rim and other sealing members in separable relationship and meeting the fore and aft sealing members at an angle, the said members comprising a channel structure on and co-extensive with one of the rims and having side walls rigidly connected by a base between the walls to form a channel, a flexible blade co-extensive with and projecting from the other rim to enter the channel and touch one of the walls, and an inflatable tube in the channel against the other wall to press the blade against the first-mentioned wall when the tube is inflated, the first-mentioned wall being discontinuous at the junction of the fore and aft members with the other members.

References Cited in the file of this patent

UNITED STATES PATENTS

| | | |
|---|---|---|
| 2,361,298 | Laddon | Oct. 24, 1944 |
| 2,596,045 | Rogallo | May 6, 1952 |